United States Patent
Sun et al.

(10) Patent No.: US 12,031,215 B2
(45) Date of Patent: Jul. 9, 2024

(54) ZINC ALLOY COATING LAYER OF PRESS-HARDENABLE STEEL

(71) Applicants: NUCOR CORPORATION, Charlotte, NC (US); TECK METALS LTD., Vancouver (CA)

(72) Inventors: Weiping Sun, Charlotte, NC (US); Nan Gao, Vancouver (CA); Yihui Liu, Vancouver (CA)

(73) Assignees: NUCOR CORPORATION, Charlotte, NC (US); TECK METALS LTD., Vancouver (CA)

( * ) Notice: Subject to any disclaimer, the term of this patent is extended or adjusted under 35 U.S.C. 154(b) by 0 days.

(21) Appl. No.: 17/794,885

(22) PCT Filed: Jan. 29, 2020

(86) PCT No.: PCT/US2020/015621
§ 371 (c)(1),
(2) Date: Jul. 22, 2022

(87) PCT Pub. No.: WO2021/154240
PCT Pub. Date: Aug. 5, 2021

(65) Prior Publication Data
US 2023/0066303 A1 Mar. 2, 2023

(51) Int. Cl.
*C23F 13/06* (2006.01)
*C23C 2/28* (2006.01)

(52) U.S. Cl.
CPC .............. *C23F 13/06* (2013.01); *C23C 2/28* (2013.01); *C23C 2/29* (2022.08)

(58) Field of Classification Search
None
See application file for complete search history.

(56) References Cited

U.S. PATENT DOCUMENTS

| | | | |
|---|---|---|---|
| 5,695,822 A | 12/1997 | Carey, II et al. | |
| 6,562,474 B1 | 5/2003 | Matsuki et al. | |
| 2003/0089432 A1 | 5/2003 | Carey, II et al. | |
| 2007/0256808 A1 | 11/2007 | Fleischanderl et al. | |
| 2009/0098408 A1 | 4/2009 | Sun | |
| 2011/0139317 A1 | 6/2011 | Taniguchi et al. | |
| 2011/0284136 A1 | 11/2011 | Kurosaki et al. | |
| 2014/0170438 A1 | 6/2014 | Baumgart et al. | |
| 2014/0212684 A1 | 7/2014 | Kawata et al. | |
| 2014/0234658 A1 | 8/2014 | Nozaki et al. | |
| 2014/0342181 A1 | 11/2014 | Mutschler et al. | |
| 2015/0191077 A1 | 7/2015 | Allely et al. | |
| 2015/0314568 A1 | 11/2015 | Takahashi et al. | |
| 2016/0215376 A1 | 7/2016 | Luther et al. | |
| 2016/0319415 A1 | 11/2016 | Lee et al. | |
| 2018/0258514 A1 | 9/2018 | Oka et al. | |
| 2019/0194792 A1 | 6/2019 | Kim et al. | |
| 2021/0180172 A1 | 6/2021 | Speer et al. | |

FOREIGN PATENT DOCUMENTS

| | | |
|---|---|---|
| CA | 2850332 A1 | 4/2013 |
| CN | 104099550 A | 10/2014 |
| JP | 56108847 A | 8/1981 |
| JP | 57067153 A | 4/1982 |
| JP | 07216526 A | 8/1995 |
| JP | 2013189671 A | 9/2013 |
| KR | 960006049 | 5/1996 |
| KR | 101786377 B1 | 10/2017 |
| KR | 101819393 B1 | 1/2018 |
| WO | 2018085672 A1 | 5/2018 |

OTHER PUBLICATIONS

Kawagushi et al., The Physical Metallurgy of Zinc Coated Steel, edited by A.R. Marder, The Minerals, Metals & Materials Society, 1993, pp. 153-167.
Lee, Chang Wook, et al; "Liquid-Metal-Induced Embrittlement of Zn-Coated Hot Stamping Steel," Metallurgical and Materials Transactions A, 2012, pp. 5122-5127, vol. 43A.
Yang, Honglin, et al.; Effect of strip entry temperature on the formation of interfacial layer during hot-dip galvanizing of press-hardened steel, Surface & Coatings Technology, 2014, pp. 269-274, vol. 240, XP028829949.
International Bureau; International Application No. PCT/US2019/020153, International Preliminary Report on Patentability, Sep. 10, 2020.
ISA/US; International Search Report and Written Opinion for International Application No. PCT/US2019/020153 dated May 1, 2019, 12 Pages.
International Bureau, International Application No. PCT/US2019/020154, International Preliminary Report on Patentability, Sep. 10, 2020.
ISA/US; International Search Report & Written Opinion for International Application No. PCT/US2019/020154 dated May 10, 2019, 11 Pages.
ISA/US, International Search Report and Written Opinion for International Application No. PCT/US2020/015621, Apr. 22, 2020, 8 pages.
European Patent Office; Partial Supplementary European Search Report for European Patent Application No. 19759954.1 dated Aug. 19, 2021, 15 Pages.
European Patent Office; Extended European Search Report for European Patent Application No. 19759954.1 sated Nov. 19, 2021, 11 Pages.

(Continued)

*Primary Examiner* — Anthony M Liang
(74) *Attorney, Agent, or Firm* — Christopher J. Knors; Moore & Van Allen PLLC (57) ABSTRACT

The present disclosure relates to a coating of a press hardened steel strip, the coating providing cathodic protection. The coating of the post-press hardened steel strip comprises zinc, aluminum, and at least one element selected from manganese (Mn) and/or antimony (Sb).

14 Claims, 4 Drawing Sheets

(56) References Cited

OTHER PUBLICATIONS

European Patent Office; Extended European Search Report for European Patent Application No. 19706766.6 dated Oct. 19, 2021, 16 Pages.
USPTO; International Preliminary Report on Patentability for International Patent Application No. PCT/US2020/015621 dated Aug. 11, 2022, 6 Pages.
Canadian Patent Office; Office Action for Canadian Patent Application No. 3.092.904 dated Jan. 25, 2024, 7 Pages.
European Patent Office; Office Action for European Patent Application No. 19759954.1 dated Apr. 12, 2024, 7 Pages.

ZINC ALLOY COATING LAYER OF PRESS-HARDENABLE STEEL

CROSS-REFERENCE TO RELATED APPLICATIONS

This application is a 35 U.S.C. § 371 National Stage Application of International Application No. PCT/US20/15621, filed Jan. 29, 2020, the entirety of which is incorporated herein by reference.

TECHNICAL FIELD

The present disclosure relates to a zinc-based alloy coating of a press-hardenable steel substrate or sheet. In particular, the zinc-based alloy coating is provided on a press-hardenable steel (PHS) surface that has been hot-pressed, the coating comprising zinc and an amount of manganese and/or antimony.

BACKGROUND

Since the early 2000's, the usage of PHS in the manufacture of lightweight vehicles has significantly increased. A great advantage of the press-hardening technology (also referred to as "hot stamping" or "hot press forming") is its ability to produce complicated structural components with ultrahigh strength while avoiding issues caused by cold forming high-strength steels, such as increased springback and dimensional inaccuracy. There are two press-hardening methods: the direct press-hardening method and the indirect press-hardening method. In the direct press-hardening process, a blank of PHS is austenitized at a temperature above 850° C. for 3-10 min, and subsequently pressed and quenched at a rapid cooling rate (>25° C./s) to attain martensitic transformation. The indirect process includes a cold preforming step prior to the austenitization treatment. This preforming step reduces the amount of high temperature deformation, thus mitigating the cracking problem.

Current requirements for PHS are that its surface coating be able to prevent the steel from oxidation and decarburization during hot stamping/hot press forming, and able to provide press-hardened parts with corrosion protection in service. Various coatings and coating systems have been developed for PHS applications to meet these requirements. Of these coatings, an aluminum or aluminized coating is used, which consists of either pure aluminum (Type II) or aluminum with 5 wt. %-11 wt. % Si (Type I). However, such aluminized coatings are only able to provide a steel substrate with barrier protection. A shortcoming of this type of protection is that once the barrier coating is damaged or develops pores, the exposed areas of the steel substrate could be attacked with no further protection. After hot stamping/hot press forming, coating cracks and break-offs are often observed in such aluminized coatings due to the coating brittleness. Weldability and paintability of aluminized coatings after hot stamping are often concerns for automotive applications.

Galvanized (GI) and galvannealed (GA) coatings have long been an excellent corrosion protection choice for automotive steel parts. These zinc-based coatings are able to offer cathodic protection to the steel substrate, thus possessing a great advantage in cut-edge protection. Moreover, conventional GI and GA coatings that are produced on continuous galvanizing lines (CGL) can readily retain the capability of cathodic protection even after experiencing a high temperature stamping process, however, zinc-coated PHS is generally limited to the indirect press-hardening or high temperature stamping process that is more time-consuming and requires additional equipment, thus increasing costs.

Thus, there remains a technical challenge of a direct-hardening process for zinc-coated PHS. The technical challenge with the direct-hardening process for zinc-coated PHS is twofold: zinc evaporation and micro-cracking. Since PHS blanks must be heated to an austenitization temperature above or close to the boiling temperature of zinc (906° C.) prior to stamping, zinc evaporation during hot stamping/hot press forming occurs. To suppress this zinc evaporation, one conventional approach is to apply a barrier layer onto the top of the zinc-based coating. The barrier layers can include silicone resin film (Japanese Patent Publication 2007-06378), zinc oxide (U.S. Pat. No. 7,673,485B2) and hexavalent chromium-containing overlay (US 2012/018437A1), for example. Applying a barrier layer onto a zinc-based coating results in a significant increase in cost and possibly gaseous hazards generated from the barrier layer during the hot-stamping process. These references do not discuss either inhibiting a zinc-rich gamma ($\Gamma$) phase or promoting the diffusion of zinc into alpha ($\alpha$) (Fe,Zn) phase at or above the $A_3$ temperature of steel and/or under the conditions of hot press forming.

Another approach to curbing zinc evaporation is alloying the zinc coating with oxygen-affine elements. U.S. Pat. No. 8,021,497B2 relates to a method for producing a hardened steel part having cathodic corrosion protection. As per the patent, the cathodic protection is enabled by a zinc-based coating which is produced through a continuous coating process, either hot-dip galvanizing or an electrolytic process, with additions of one or more oxygen-affine elements including Mg, Si, Ti, Ca, Al and/or Mn in a total quantity of 0.1 wt. % to 15 wt. %. The purpose of adding one or more oxygen-affine elements is to form surface oxide, thereby suppressing zinc evaporation. However, it should be pointed out that the addition of Al to the zinc bath (typically ranging from 0.11 wt. % to 0.25 wt. %) is a common practice in continuous galvanizing production. This reference does not discuss either inhibiting a zinc-rich gamma ($\Gamma$) phase or promoting the diffusion of zinc into an alpha ($\alpha$) (Fe,Zn) phase at or above the $A_3$ temperature of steel or under the conditions of hot press forming. During the hot dipping, the bath Al reacts with the steel strip to form a thin $Fe_2Al_5Zn_x$ intermetallic layer. This intermetallic layer restrains the development of a brittle Fe—Zn intermetallic, thus enhancing coating adherence and formability. As a result, there is always a small amount of Al in conventional GI or GA coatings. During the hot stamping/hot press forming of a galvanized or galvannealed PHS, the Al in the coating would be oxidized into $Al_2O_3$ which acts as a protective layer to suppress zinc evaporation.

Manganese (Mn) may play the same role as aluminum (Al) in suppressing zinc evaporation. Manganese oxide is commonly present on the surfaces of press-hardened steel parts which have been previously galvanized or galvannealed (without any addition of Mn in the bath). Manganese comes from the press-hardenable steel substrate which typically contains 1.0 wt. %-1.5 wt. % Mn. During the austenitization treatment, Mn in the steel substrate diffuses into the zinc coating and is subsequently oxidized into manganese oxide which coexists with $Al_2O_3$ on the surface of hot press formed parts.

In addition to the above elements from the bath and/or from the steel substrate, part of the zinc in the coating is oxidized into ZnO which, along with aluminum oxide and manganese oxide, acts as a barrier to suppress zinc evaporation. In effect, a sufficient surface oxide layer is always formed on conventional GI/GA coatings as long as there is a sufficient amount of oxygen in the atmosphere.

Compared to zinc evaporation, micro-cracking is a far more severe issue that limits the practical application of galvanized coatings in the direct press-hardening of PHS. This issue results from so-called liquid metal induced embrittlement (LMIE) or liquid metal embrittlement (LME) (hereinafter LMIE and LME are used interchangeably), as is also observed in the welding of non-PHS and other grades of advanced high-strength steel. It is generally understood that zinc coated steel after experiencing a high temperature stamping process or a press hardening process provides a coating that contains surface oxides (ZnO and $Al_2O_3$), a $\Gamma$ phase (Zn—Fe intermetallic phase) and $\alpha$ (Fe, Zn) phase. The $\Gamma$ phase contains about 70 wt. % Zn and transforms from a zinc-rich liquid phase. The $\alpha$ (Fe, Zn) phase typically contains 20 wt. % to 40 wt. % Zn. The resultant coating having zinc in these $\Gamma$ and $\alpha$ (Fe, Zn) phases provides the cathodic protection to the steel substrate. The melting point of zinc is only about 420° C. During the austenitization treatment (>850° C.), the zinc-based coating inevitably becomes molten. Under stress-applied conditions (i.e. stamping conditions), the zinc-rich liquid promotes the formation and propagation of micro-cracks in the steel substrate, more likely along the grain boundaries of the steel. After being hot press formed, the zinc-rich liquid phase is present in the resultant coating as $\Gamma$ phase which is readily distinguished from $\alpha$ (Fe, Zn) using conventional metallurgical techniques. However, the zinc-rich liquid (as $\Gamma$ phase after solidification) formed in conventional GI and GA coatings during the austenitization treatment is most likely a main cause of LMIE, which promotes the inception and propagation of micro-cracks in the steel substrate. For example, a zinc-rich $\Gamma$ phase was prevalent in the example coatings described in U.S. Pat. No. 8,021,497B2 as revealed in the images of the coating microstructures.

To overcome the cracking issue, one approach attempted was to minimize the portion of zinc-rich liquid in the resultant coating. Based on this approach, zinc is partially replaced with one or more alloying elements to result in a zinc alloy coating with a high solid-liquid transformation temperature (i.e. melting point). An example of such an approach is disclosed in U.S. Pat. No. 5,266,182 where a zinc alloy coating is provided containing at least 10 wt. % nickel (Ni). The Zn—Ni alloy coating is believed to consist mostly of a $\Gamma$-$Zn_{21}Ni_5$ phase. This intermetallic phase has a high melting point (880° C.) close to austenitization temperature so that the formation of liquid phase can be significantly reduced during the hot stamping/hot press forming. The introduction of that much nickel to a zinc bath greatly increases costs. A high nickel concentration also leads to the formation of a significant amount of dross at a typical galvanizing temperature, thus making it extremely difficult to produce the coating using the mainstream hot-dip galvanizing process.

Another approach to resolving the cracking issue is disclosed in US Patent Application 2014/0170438 A1 where a zinc alloy coating containing a very high concentration of manganese (Mn), for example at least 5 wt. % Mn, is provided. This patent application discloses that such a high amount of Mn addition in Zn would substantially increase the alloy melting point, thereby averting the issue of LMIE. However, due to the requirement for such high alloying additions of Mn, this coating can only be produced by an electrolytic process rather than by a continuous hot-dip process employing molten metals. Electrolytic coating production is generally more costly than continuous galvanizing production, and in addition, extra expense is incurred as a result of high alloying additions. For at least these reasons, the number of electro-galvanizing lines is fewer than that of CGL, thus limiting the production of these high alloy zinc coatings.

Another measure to reduce micro-cracking is to reduce the liquid phase by heat treating zinc-based coatings prior to hot stamping/hot press forming, which is essentially an indirect press-hardening or hot-stamping process. For example, US Patent Application Publication No. 2014/0342181A1 discloses a method for producing zinc-coated steel strip for press-hardening applications, where prior to hot stamping/hot press forming, a galvannealed steel strip is heat treated at a temperature between 850° F. (454° C.) and 950° F. (510° C.) in a protective atmosphere (100% nitrogen ($N_2$) or 95% $N_2$ and 5% hydrogen ($H_2$)) to pre-alloy the coating. In a conventional CGL, however, there typically is no heating section available to subsequently (or in-line) heat treat the galvannealed steel strip in a protective atmosphere. Thus, this process would add considerable cost.

SUMMARY

In one example, a post-hot pressed cathodic corrosion-protection coating of a sheet steel is provided, the corrosion-protection coating comprising a surface, the surface comprising surface oxides of iron, zinc; aluminum, and an amount of one or both of manganese (Mn) and antimony (Sb). In one example, the surface oxides comprise zinc, aluminum, manganese and iron. In another example, alone or in combination with any of the previous examples, the surface oxides are selected from the group consisting of zinc, aluminum, antimony, and iron.

In another example, alone or in combination with any of the previous examples, a ratio of atomic weight percent amount of zinc to aluminum is about 0.8 to about 8.0 in the surface oxides. In another example, alone or in combination with any of the previous examples, a ratio of atomic weight percent amount of zinc to oxygen is about 0.3 to about 0.7 in the surface oxides. In another example, alone or in combination with any of the previous examples, a ratio of atomic weight percent amount of aluminum to oxygen is about 0.1 to about 0.6 in the surface oxides. In another example, alone or in combination with any of the previous examples, a ratio of atomic weight percent amount of zinc to aluminum is about 0.8 to about 8.0 and a ratio of atomic weight percent amount of zinc to oxygen is about 0.3 to about 0.7 in the surface oxides.

In another example, alone or in combination with any of the previous examples, a ratio of atomic weight percent amount of zinc to aluminum is about 0.8 to about 8.0 and a ratio of atomic weight percent amount of aluminum to oxygen is about 0.1 to about 0.6 and a ratio of atomic weight percent amount of zinc to oxygen is about 0.3 to about 0.7 in the surface oxides.

In another example, alone or in combination with any of the previous examples, an $\alpha$ (Fe, Zn) phase is present and a zinc-rich (gamma) ($\Gamma$) phase is absent. In another example, alone or in combination with any of the previous examples, the steel sheet comprises boron.

DETAILED DESCRIPTION

One objective of the present disclosure is to provide a solution to the technical problem of applying a zinc-based alloy coating to press-hardenable steel strip through a conventional continuous galvanizing line (CGL) that can be used in a direct press-hardening process at a high austenitization temperature, e.g., up to 950° C., and subsequently provide cathodic protection to the coated steel substrate without the detriment of increased cost, longer production time, or additional manufacturing steps.

The present disclosure provides a solution to this technical problem by providing a zinc-based alloy coating bath and method of coating for PHS where the $\Gamma$ phase is reduced or eliminated in the resultant coating. Consequently, the effect of liquid metal induced embrittlement (LMIE), which is a main cause of micro-cracking in the press hardened steel parts, is averted or significantly reduced. In the presently disclosed process using the disclosed bath, zinc-rich liquid is minimized and thus, after being hot press formed, the GI and GA coatings, which can be produced on CGLs, can readily retain the capability of cathodic protection for the PHS substrate.

The press hardenable steel can be a complex phase steel, for example a dual phased PHS steel, a complex microstructure steel with fine complex precipitates, a TRIP steel, a PHS-ductile biphasic steel, and the like. Suitable steel substrates for the presently disclosed coating bath and coating method can be provided by using conventional steel casting, hot rolling, and cold rolling process techniques. For example, a continuous metal slab caster having a casting mold, such as but not limited to a compact strip production facility and introducing molten steel having a composition having elements within defined PHS ranges into the casting mold. The steel slabs can be hot rolled to form respective hot bands using hot rolling termination temperatures or finishing exit temperatures, for example ranging from $(A_{r3}-20)$ ° C. to 1000° C. (1832° F.). Immediately after completing hot rolling, the hot rolled steel sheets can be water cooled at a conventional run-out table using cooling rates of at least 3° C./s (5.4° F./s) down to the coiling temperatures anywhere below 800° C. (about 1472° F.) ranging from 425° C. (797° F.) to 750° C. (1382° F.), and then can be coiled at the corresponding temperatures. After hot rolling and coiling, the hot bands can be pickled or otherwise surface treated to improve surface quality and then cold rolled to obtain a final thickness of the cold rolled steel sheet. Typically reduction is at least 25% up to 80% of the hot rolled steel sheet thickness. In one example, cold rolling can be performed so as to provide a cold rolled steel sheet of approximately 1.5 mm thickness. In another example, the cold rolling step can be performed at a conventional reversing cold mill using total cold reduction in a range between 30% and 70%.

In one example, a press-hardenable steel is used as the substrate. Exemplary press-hardenable steel useful in the current disclosure is a medium carbon, boron steel, such as some OEM automotive grade steels. For example, a medium carbon, boron steel comprising or consisting of 0.15-0.40 weight percent carbon, 1.0--3.0 weight percent manganese (Mn), 0.01-0.09 weight percent aluminum (Al), less than or equal to ~2.0 weight percent silicon (Si) less than or equal to 0.9 weight percent chromium (Cr), 0.02-0.1 weight percent titanium (Ti), less than or equal to 0.1 weight percent niobium, less than or equal to 0.015 weight percent nitrogen (N), —less than 0.0050 weight percent boron (B) and no purposefully added phosphorus and sulfur is used.

In another example, a medium carbon, non-boron, low manganese press hardenable steel can be used, for example, comprising or consisting of 0.17--0.30 weight percent carbon, ~1.0-3.0 weight percent manganese, 0.015-0.05 weight percent aluminum, 0.2-2.0 weight percent of silicon, less than or equal to 0.06 weight percent titanium, less than or equal to 0.10 weight percent niobium (Nb) and no purposefully added boron, phosphorus, and sulfur is used.

In another example, a low carbon press hardenable steel can be used, for example, comprising or consisting of ~0.010-0.12 weight percent carbon, ~0.05-1.9 weight percent manganese, 0.015-0.06 weight percent Al, less than 0.005 weight percent boron, less than 0.50 weight percent of Silicon, at least one chemical element chosen from titanium, niobium, vanadium and a combination in a range between 0.005 and 0.5 weight percent, with no purposefully added phosphorus and sulfur can be used.

In one example, a press hardenable steel useful in the current disclosure is a boron steel containing 0.20-0.25 weight percent carbon, ~1.0-1.6 weight percent manganese (Mn), ~0.01-0.10 weight percent Al, ~0.01-0.06 weight percent titanium (Ti), ~0.0005-0.0050 weight percent boron (B) as well as less than 0.5 weight percent silicon (Si) and ~0.50 weight percent chromium (Cr). In another example, the press-hardenable steel useful in the current disclosure is absent intentionally added boron (e.g., recycled scrap steel) containing alloying additions such that PHS properties are obtained, as is known in the art.

To eliminate the $\Gamma$ phase from the resultant coating on the PHS steel subsequent to hot stamping/hot press forming, hot forming, or press hardening (hereinafter collectively referred to as "press hardening"), the present disclosure controls bath chemistry and additional processing variables in the continuous galvanizing process. While it is likely that the presence of Γ phase benefits the cathodic protection due to its high zinc content (>60 wt. %), the presently disclosed bath and coating process nonetheless provides for the elimination or reduction of zinc-rich Γ phase in the resultant coating of zinc alloy coated PHS after being press hardened without loss of cathodic protection for the steel substrate.

In addition, the present bath and coating method minimizes the effect of LMIE while retaining the cathodic protection of the resultant coating for the steel substrate. The production of the presently disclosed zinc-based alloy coating can be readily incorporated in a conventional CGL. Exemplary conditions for a method of coating are provided under the following conditions.

In one exemplary example the zinc-based alloy coating is applied to a cold rolled steel strip through a continuous galvanizing line (CGL), however, other galvanizing processing techniques may be used. This zinc-based alloy coating is prepared under the following conditions, using a CGL as an exemplary processing embodiment, in order to minimize F phase (i.e. the liquid phase prior to solidification) in the resultant coating after the direct press-hardening process.

In the following description a cold rolled steel strip is used as the exemplary substrate, where the cold rolled steel sheet is prepared from casting to provide a hot rolled sheet, the hot rolling termination temperature or finishing exit temperature can be between ($A_{r3}$−30) ° C. and 1000° C. (1832° F.) for example, followed by cooling after hot rolling at a mean cooling rate of at least about 3° C./s (5.4° F./s), for example, followed by coiling at a temperature below about 800° C. (about 1472° F.) down to ambient temperature. In one example, the coiling temperature is between about 425° C. (about 797° F.) and about 750° C. (about 1382° F.). The hot rolled sheet is subsequently cold rolled to the desired steel sheet thickness, with a cold reduction of at least 25%.

Other substrate forms can be used such as steel slab, hot rolled or cold rolled, wire, rebar and the like. The cold rolled steel strip can be hot dipped in the presently disclosed bath without being annealed. In one example, the steel sheet is annealed before hot-dipping using the following conditions. Any industrial annealing conditions are acceptable to carry out the present disclosure.

Bath Chemistry

For a galvanizing bath, an effective amount of aluminum (Al) (which is the amount of Al dissolved in the molten zinc bath) typically ranges from 0.15 wt. % to 0.25 wt. % so as to form a $Fe_2Al_5Zn_x$ layer at the steel/coating interface. This interfacial layer plays a role in impeding the development of brittle Fe—Zn intermetallics—thus enhancing the coating adherence and formability. In one example of the presently disclosed method, an "inhibition" role of the press-hardenable steel substrate is substantially weakened to facilitate the Fe—Zn diffusion during the hot-stamping process. For press-hardenable steels, however, aluminum provides another role, e.g., the Al in the coating oxidizes into $Al_2O_3$ during the hot stamping/hot press forming, which acts as a protective layer on the surface of the resultant coating that suppress zinc evaporation.

A high bath Al level results in a coating with a high content of Al so as to promote the formation of $Al_2O_3$ during the hot-stamping process. However, there is an undesirable side effect resulting from a high bath Al level in a hot dipped zinc coating bath. The Al-rich inhibition layer would be overly developed at the steel/coating interface, making it difficult to break down during the hot stamping/hot press forming process. During the austenitization treatment, a fast diffusion of the zinc into the steel iron suppresses and/or competes with zinc evaporation and minimizes the liquid phase of zinc in the coating. If this Zn—Fe interaction is retarded by a strong interfacial layer, both zinc evaporation and the portion of liquid phase would consequently increase, which leads to undesirable effects.

The current disclosure overcomes this technical problem by providing the following technical solution. While the dissolved Al content in the presently disclosed bath is provided in a range from 0.12 wt. % to 0.50 wt. % Al so as to provide for the formation of sufficient $Al_2O_3$ during the hot-stamping process, nonetheless that amount of Al addition is such that the formation of a strong Al-rich inhibition layer at the substrate interface that would otherwise hinder the Fe—Zn diffusion is avoided or eliminated. To achieve this technical solution, the control of the bath Al wt. % alone is not sufficient. In the current disclosure, an amount of at least one element selected from Mn and antimony (Sb) is added to the bath in combination with the aforementioned dissolved Al content in the range from 0.12 wt. % to 0.50 wt. % Al with no purposefully added iron.

In one example, at least one element selected from Mn or Sb is used. When only one element is selected and that element is Mn, the following formula (I) applies: [0.1+Mn (wt. %)/30]≤Al (wt. %)≤[0.3+Mn (wt. %)/20] (I).

When both Mn and Sb our employed in the bath, then formula (II) applies: [0.1+Mn (wt. %)/30+Sb (wt. %)/50] ≤Al (wt. %)≤[0.3+Mn (wt. %)/20+Sb (wt. %)/50] (II).

In one example, the total amount of Mn and/or Sb added to the bath is from about 0.2 wt. % to about 3.0 wt. %, and the dissolved Al content is in the range from 0.10 wt. % to 0.50 wt. % Al, the remainder being essentially zinc with no purposefully added iron.

In one example, the bath is from about 0.3 wt. % to about 3.0 wt. % total Mn and/or Sb, and the dissolved Al content is in the range from 0.10 wt. % to 0.50 wt. % Al, with no other purposefully added transition metals, the remainder being essentially zinc, and satisfying formula (I).

In another example, the bath is from about 0.3 wt. % to about 2.0 wt. % total Mn and/or Sb, and the dissolved Al content is in the range from 0.12 wt. % to 0.50 wt. %, the remainder being essentially zinc. In another example, the bath is from about 0.3 wt. % to about 2.0 wt. % total Mn and/or Sb, and the dissolved Al content is in the range from 0.12 wt. % to 0.50 wt. %, with no other purposefully added transition metals, the remainder being essentially zinc, and satisfying formula (I).

In another example, the bath is from about 0.3 wt. % to about 2.0 wt. % total Mn and/or Sb, and the dissolved Al content is in the range from 0.12 wt. % to 0.50 wt. %, the remainder being essentially zinc. In another example, the bath is from about 0.5 wt. % to about 1.0 wt. % total Mn and/or Sb, and the dissolved Al content is in the range from 0.12 wt. % to 0.50 wt. %, with no other purposefully added transition metals, the remainder being essentially zinc, and satisfying formula (I) or, if Sb is present, satisfying formula (II).

In another example, the bath is from about 0.3 wt. % up to 2.0 wt. % Mn and 0.3 wt. % up to 1.0 wt. % Sb, with the total wt. % of Mn+Sb≤–3.0, and the dissolved Al content is in the range from 0.15 wt. % to 0.37 wt. % Al, the remainder being essentially zinc. In another example, the bath is from about 0.4 wt. % up to 1.5 wt. % Mn and 0.3 wt. % up to 1.0 wt. % Sb, with the total wt. % of Mn+Sb≤2.5, and the dissolved Al content is in the range from 0.15 wt. % to 0.37 wt. % Al, with no other purposefully added transition metals, the remainder being essentially zinc, and satisfying formula (II).

In another example, the bath is at least 0.4 wt. % up to about 2.0 wt. % Mn and the dissolved Al content is at least 0.15 wt. % up to 0.37 wt. %, the remainder being essentially zinc and satisfying formula (I). In another example, the bath is at least 0.4 wt. % up to about 2.0 wt. % Mn and the dissolved Al content is at least 0.15 wt. % up to 0.37 wt. %, with no other purposefully added transition metals, the remainder being essentially zinc and satisfying formula (I).

In one example, the bath is at least 0.2 wt. % to about 3.0 wt. % total Mn and/or Sb, and the dissolved Al content is in the range from 0.15 wt. % to 0.50 wt. % Al, with no other purposefully added transition metals, the remainder being essentially zinc and satisfying formula (I) and if Sb is present, satisfying formula (II). In another example, the bath is at least 0.2 wt. % to about 2.0 wt. % total Mn and/or Sb, and the dissolved Al content is at least 0.19 wt. % to 0.50 wt. % Al, with no other purposefully added transition metals, the remainder being essentially zinc and satisfying formula (I), and if Sb is present, satisfying formula (II). In another example, the bath is at least 0.2 wt. % to about 2.0 wt. % total Mn and/or Sb, and the dissolved Al content is at least 0.2 wt. % to 0.50 wt. % Al, with no other purposefully added transition metals, the remainder being essentially zinc and satisfying formula (I), and if Sb is present, satisfying formula (II).

In one example, the bath is at least 0.3 wt. % to about 2.0 wt. % total Mn and/or Sb, and the dissolved Al content is in the range from 0.15 wt. % to 0.50 wt. % Al, with no other purposefully added transition metals, the remainder being essentially zinc. In another example, the bath is at least 0.4 wt. % to about 2.0 wt. % total Mn and/or Sb, and the dissolved Al content is at least 0.19 wt. % to 0.50 wt. % Al, with no other purposefully added transition metals, the remainder being essentially zinc and satisfying formula (I) and if Sb is present, satisfying formula (II). In another example, the bath is at least 0.4 wt. % to about 2.0 wt. % total Mn and/or Sb, and the dissolved Al content is at least 0.2 wt. % to 0.50 wt. % Al, with no other purposefully added transition metals, the remainder being essentially zinc and satisfying formula (I), and if Sb is present, satisfying formula (II).

It has been disclosed that the addition of Mn in a galvanizing bath can shift the invariant point of (delta) $\delta$ ($FeZn_{10}$)/(eta) $\eta$ ($Fe_2Al_5$) in the Zn—Fe—Al ternary system to a higher Al level. With the addition of Mn in the presently disclosed bath, however, a higher than normal Al level is used to form a complete $Fe_2Al_5Zn_x$ inhibition layer at the steel/coating interface. Alternatively, Sb can be employed so as to possibly interact with the bath Al, thus reducing the effectiveness of the Al-rich inhibition layer for the reasons stated above. The use of Mn and/or Sb additions in the presently disclosed bath is believed to ease the inhibition effect of the interfacial layer and facilitate Fe—Zn diffusion during the high temperature press hardening process. In addition, a small amount of Sb can be added (with or without Mn) to the galvanizing bath so as reduce the surface tension of molten zinc, thus improving the coating uniformity and smoothness of the PHS sheet.

Sheet Coating Weight

To minimize the zinc-rich liquid phase in the resultant coating utilizing the presently disclosed method, it has heretofore been found to control the coating weight of the sheet in the CGL. Excessive zinc oxidation and a high portion of the zinc-liquid phase are more likely to result from a thick coating than from a thin coating. However, overly thin coatings may not be sufficient to withstand zinc evaporation and oxidation. In one example, the currently disclosed method targets a coating weight between 40 $g/m^2$ and 120 $g/m^2$. In another example, the currently disclosed method targets a coating weight between 60 $g/m^2$ and 90 $g/m^2$. These coating weights ensure that sufficient zinc for cathodic protection can be preserved in the resultant coating after the direct press-hardening process.

Pre-Alloying or Galvannealing of the Coating and Substrate

In one example, the coated steel sheet can be used immediately following the coating without pre-alloying or galvannealing. In another example, the coated steel sheet is pre-alloyed or galvannealed. Typically, a conventional galvannealing (GA) process, the bath Al level is adjusted slightly lower than the bath Al level for a galvanizing (GI) process, e.g., between about 0.11 wt. % to about 0.14 wt. %, lower than the galvanizing bath Al level. The low Al level in the conventional GA bath is chosen to avoid formation of a complete $Fe_2Al_5Zn_x$ inhibition layer to hinder the Fe—Zn diffusion. However, this low Al level is insufficient for PHS substrates and their use in subsequent press hardening applications.

Thus, to overcome this technical problem of the conventional methods and the coatings they produce, in one example of the current disclosure, the press-hardenable steel strip is reheated immediately following the hot dipping so as to promote the alloying process. In one example, the hot-dipped press hardenable steel strip is reheated using a high galvannealing temperature of between about 480° C. and about 600° C., with a holding time from 2 to 20 seconds to provide a pre-alloyed substrate. In another example, the hot-dipped press hardenable steel strip is reheated using a high galvannealing temperature of between about 520° C. and about 580° C., with a holding time from 5 to 20 seconds to provide a pre-alloyed substrate. Due to the Al content higher than 0.15 wt. % used in the bath providing the precursor coating, the precursor coating composition cannot be fully alloyed in a conventional galvannealing furnace and is referred to as a pre-alloyed coating. Compared to the unalloyed coating (i.e. galvanized coating), this pre-alloyed coating is more readily converted into the presently disclosed post-hot pressed zinc-containing α-Fe phase coating, thus minimizing the zinc-rich liquid phase in the resultant coating. Thus, a combination of bath chemistry and processing conditions coordinate synergistically to provide a precursor coating suitable for providing a subsequent press hardened coating having cathodic corrosion protection applications.

Examples

Conventional Zn baths and Zn baths providing the precursor coating presently described were prepared using conventional methods. From a representative zinc bath providing the precursor coatings of the present disclosure, containing approximately 0.15% Al and 0.7% Mn, top dross particles were taken for analysis. The analysis found that the top dross contained approximately 4.5 wt. % Al and 3.1 wt. % Mn. Medium carbon and boron containing steels were used, where medium carbon steels had the chemical composition (in weight percent): 0.170-0.250% C, 0.45-2.0% Mn, 0.015-0.05% Al, 0.0005-0.0025% B, 0.010-0.060% Ti, and absent intentionally added phosphorus (P), and sulfur (S); and the low carbon and non-boron-containing steels had the chemical composition: 0.015-0.08% C, 0.20-1.0% Mn, 0.025-0.045% Al, and absent intentionally added B, P and S. The substrate sample material was a cold-rolled boron press hardenable steel produced by Nucor Corporation with a gauge of 1.2 mm. The steel sheet was sheared into 200×

120×1.2 (mm) sample coupons with the length parallel to the rolling direction. A hot-dip galvanizing simulator was employed to anneal and galvanize these sample coupons in a Zn-0.22% Al bath with small additions of Mn and Sb. The bath temperature was maintained at 463° C., and dipping time was 3 sec. At a fixed dew point of −40° C., the steel coupon was annealed in a 5% $H_2$—$N_2$ atmosphere. In addition to hot dip galvanizing, galvannealing was carried out for some of the coupons at a galvanneal temperature ranging from 500° C. to 550° C. for 10 seconds. The target coating weight for the aforementioned galvanized samples was 60 g/m$^2$ for galvanized coatings and 70 g/m$^2$ for galvannealed coatings. Comparative examples using conventional Zn—Al baths without added Mn/Sb were prepared using conventional methods.

Austenitization was carried out at 900° C., 930° C. or 950° C. with a dwell time from 5 to 12 min. Following austenitization in the furnace (with no protective atmosphere), the samples were transferred to a die and immediately pressed and quenched. The galvanized or galvannealed samples were cut into 190×40 (mm) strips for hot stamping using a die setup comprised of a fixed male punch, fixed female die cavity, and an adjustable pressure pad (up to 29 kN total force) and a press capable of having a punch speed of up to 5 in/sec, which is representative of an industrial hot stamping process. Heating of the samples was performed with a furnace having a control system to ensure a uniform temperature distribution and is able to heat the blank samples to at least 950° C. in less than 3 minutes. One side of the hot-pressed sample was analyzed for structure and surface composition of the post-formed galvanizing coating. Metallographic samples were examined using a scanning electron microscope (SEM) equipped with energy dispersive X-ray spectroscopy (EDS) for elemental composition of the surface of the post hot-pressed galvanized coating of the present disclosure. SEM examinations were conducted to characterize the surface morphology and microstructure of the resultant coating as well as to evaluate substrate micro-cracks.

Galvanostatic Testing:

To evaluate the cathodic protection of comparative and presently disclosed coatings, a galvanostatic test was performed to record the potential evolution of the coating versus test time at a fixed current density (10.0 mA/cm$^2$ or 12.7 mA/cm$^2$). The potential evolution of the coating was then compared to that of bare PHS tested under the same condition. The galvanostatic testing was conducted in accordance with the procedure described in U.S. Pat. No. 8,021,497B2. An electrochemical cell with three electrodes, including working electrode (i.e., sample), reference electrode (saturated calomel electrode) and counter electrode (platinum mesh), was used for the testing. The electrolyte was made of deionized water with 100 g/L $ZnSO_4 \cdot 5H_2O$ and 200 g/L NaCl.

When the post press hardened coating consists mostly of α (Fe, Zn), the coating's potential is strongly affected by the zinc content in the α (Fe, Zn) phase. The coating's potential tends to be lower as the zinc content increases, thereby increasing the potential difference from bare PHS. To maximize the effectiveness of cathodic protection, a cathodic protection amount of zinc content in the α (Fe, Zn) phase is provided by the present post press hardened coating. In one example, the present disclosure provides for above 18 wt. %, above 19 wt. %, above 20% wt., above 21 wt. %, or above 22 wt. % of zinc content in the α (Fe, Zn) phase of the post press hardened coating to provide an effective amount of cathodic protection. In another example, the present disclosure provides for above 20 wt. % of zinc content in the α (Fe, Zn) phase of the post press hardened coating to provide an effective amount of cathodic protection.

Figure 1A:
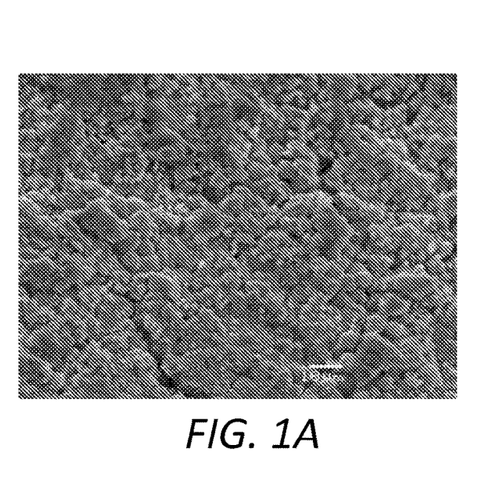
FIG. 1A is a microstructure SEM image of a surface of a press-hardened steel part with a conventional galvanized coating.
Figure 1B:
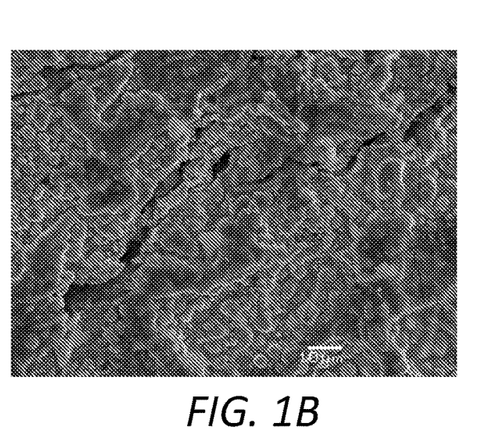
FIG. 1B is a microstructure SEM image of a surface of a press-hardened steel part with a conventional galvannealed coating.
Figure 2A:
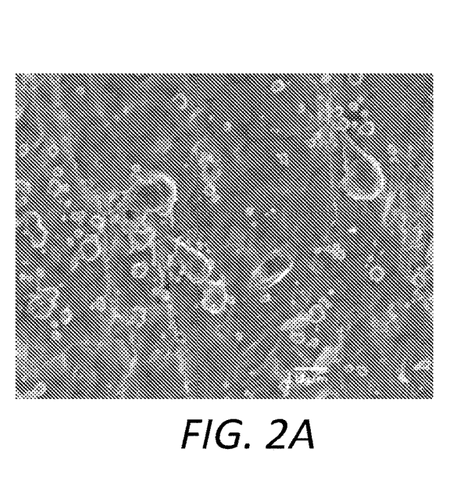
FIG. 2A is a microstructure SEM image of a surface of a surface of a press-hardened steel part with a galvanized coating in accordance with the present disclosure.
Figure 2B:
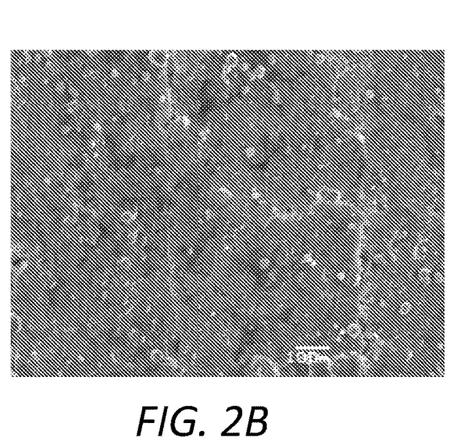
FIG. 2B is a microstructure SEM image of a surface of a press-hardened steel part with a galvannealed coating in accordance with the present disclosure.

FIGS. 1A and 1B present the surface morphology of comparative post-hot pressed CGI900/5 and CGA900/5 coatings, respectively, whereas FIGS. 2A and 2B present the surface morphology of post-hot pressed NGI930/5 and NGA930/5 coatings, respectively. Compared to CGI900/5 and CGA900/5, presently disclosed coatings NGI930/5 and NGA930/5 exhibited very different surface morphology. The surfaces of both NGI930/5 and NGA930/5 appeared much "cleaner" due to the lack of densely agglomerated oxides. The scale/nodule-like oxides enriched with O and Zn or Mn sparsely spread on the surface of NGI930/5, likely being zinc oxide or manganese oxide.

Figure 3:
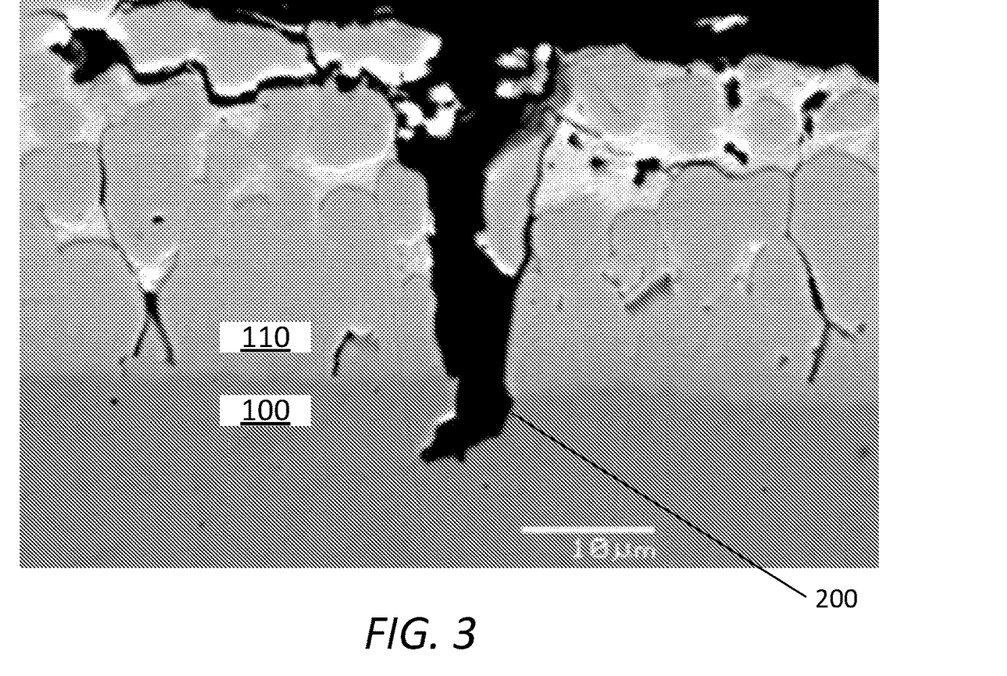
FIG. 3 is a cross section microstructure SEM image of a comparative galvanized coating steel sample after a press-hardening process.
Figure 4:
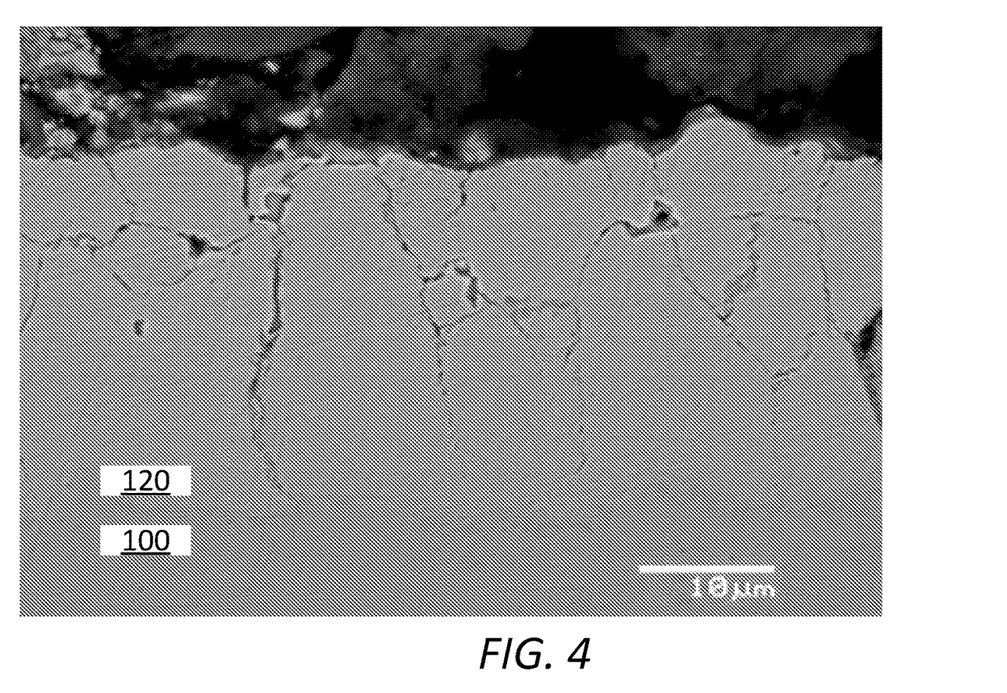
FIG. 4 is a cross section microstructure SEM image of a galvanized coating steel sample in accordance with the present disclosure after a press-hardening process.

FIGS. 3 and 4 presents the cross-sectional microstructures of hot-pressed coatings CGI900/5, indicated by callout 110, and NGI900/6, indicated by callout 120, respectively, on a steel substrate 100. As shown in FIG. 3, the hot-pressed conventional GI coating 110 evidenced both an α-Fe(Zn) and a zinc rich liquid Γ phase at the austenitization temperature, where the presence of a zinc-rich liquid was likely a major factor inducing the substrate micro-cracks 200. In contrast, the presently disclosed hot-pressed coating 120 as shown in FIG. 4 presents a more compact and uniform coating microstructure with nearly complete αFe (Zn) phase (at austenitization temperature and in the coating), substantially absent of the Γ phase which minimizes zinc liquid embrittlement, hence, FIG. 4 shows the presently disclosed coating provides for reduction or elimination of substrate micro-cracks in steel sheet during hot press processes.

Figure 5A:
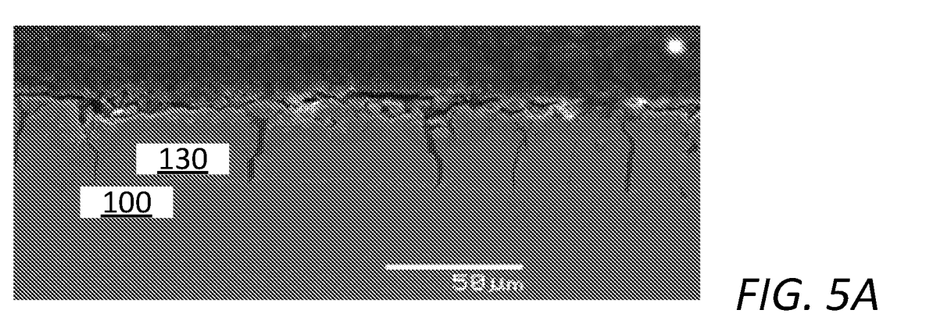
FIG. 5A is a microstructure SEM image of a galvanized coating in accordance with the present disclosure under specific austenitization conditions, cross sectioned from a press-hardened part.
Figure 5B:
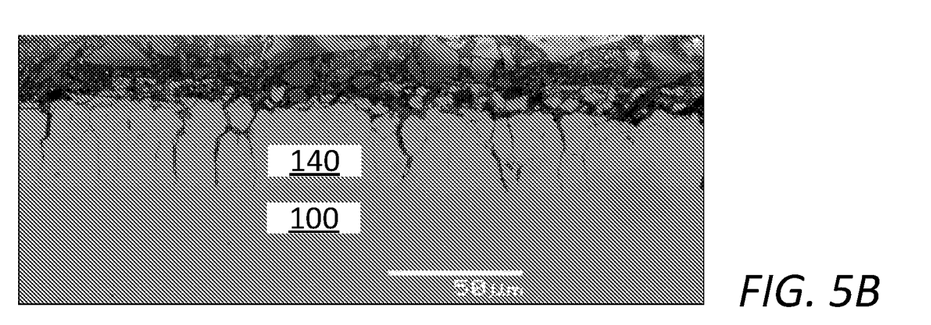
FIG. 5B is a microstructure SEM image of a galvannealed coating in accordance with the present disclosure under specific austenitization conditions, cross sectioned from a press-hardened part.
Figure 5C:
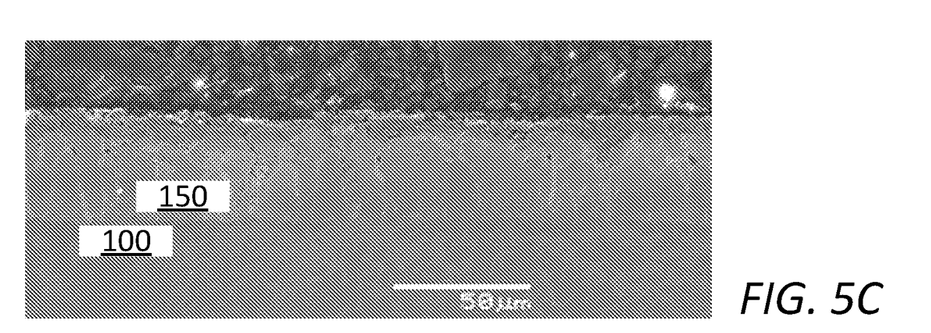
FIG. 5C is a microstructure SEM image of a galvanized coating in accordance with the present disclosure under specific austenitization conditions, cross sectioned from a press-hardened part.
Figure 6:
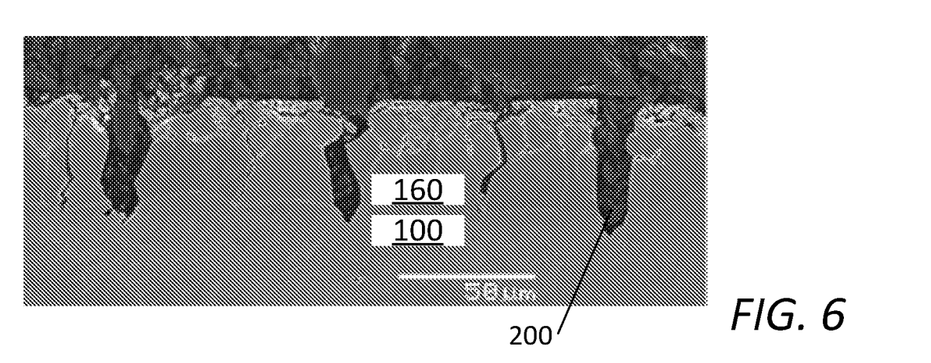
FIG. 6 is a microstructure SEM image of a conventional galvanized coating under specific austenitization conditions, cross sectioned from a press-hardened part.

FIG. 5A presents SEM micrograph showing a cross-sectional microstructure of presently disclosed galvanized hot pressed coating NGI930/6, indicated by callout 130, on a steel substrate 100 after being austenitized at 930° C. for 6 min. FIG. 5B presents SEM micrograph showing a cross-sectional microstructure of presently disclosed galvannealed hot pressed coating NGA950/6, indicated by callout 140 after being austenitized at 950° C. for 6 min. FIG. 5C presents SEM micrograph showing a cross-sectional microstructure of presently disclosed galvanized hot pressed coating NGI930/12 after being austenitized at 930° C. for 12 min. FIG. 6 depicts comparative conventional galvanized coating hot pressed coating after being austenitized at 930° C. for 6 min. Due to the presence of Mn and/or Sb in the coating, the resultant post-austenized coatings depicted in FIGS. 5A-5C were composed of Γ-free α-Fe(Zn). As shown in FIGS. 5A-5C, SEM examinations indicated that the presently disclosed hot-pressed galvanized or galvannealed coatings were either completely free of substrate micro-cracks or had only minor substrate micro-cracks (<10 μm). In contrast, the hot-pressed conventional coating (CGI930/12), indicated by callout 160, shown in FIG. 6 was found to have many substrate micro-cracks 200, some of which were deeper than 10 μm, likely because of the presence of a Zn-rich liquid phase, which converted into the Γ phase following solidification at austenization temperatures. Thus, the presently disclosed galvanized or galvannealed coatings provide for austenitizing at a high temperature for an extended time so as to eliminate the Γ phase at austenization temperatures, thereby avoiding or minimizing substrate micro-cracks caused by LMIE as well as providing a significantly wide process window for hot stamping PHS blanks having the presently disclosed coatings thereon.

Table 1 lists the exposed surface analyses of a representative sampling of conventional coatings and presently disclosed coatings (galvanized/galvannealed), both after being raised to austenization temperatures of at least 930° C. and hot-pressed. Residual oils from processing etc., if present, were removed from the exposed surface using solvents. The data of Table 1 indicates that the Mn content in the surface of presently disclosed NGA930/5 was lower than in the surface of conventional NGI930/5, likely because the scale-like Mn-rich oxide was absent on the scanned surface area of NGA930/6. NGI930/5 and NGA930/5 had nearly identical zinc content in their surfaces. More notably, the zinc contents in the surfaces of NGI930/5 and NGA930/5 were at least twice as low as in the surfaces of conventional coatings CGI900/5 and CGA900/5.

TABLE 1

Elemental contents in the top surface layer of hot-pressed coatings comparative examples and presently disclosed examples). The galvanized and galvannealed hot pressed coatings are labelled NGI and NGA, respectively, while conventional GI and aluminized coatings are dubbed CGI and AL, respectively. The austenization conditions for the samples, i.e. temperature (° C.)/time (min) are designated, e.g., "CGI900/5" - means a hot-pressed conventional GI coating that was austenitized at 900° C. for 5 min prior to hot stamping, etc.

| Hot pressed coatings | Elemental contents in the top surface layer (atom %) | | | | | Average Zn wt. % in α-Fe |
|---|---|---|---|---|---|---|
| | O | Zn | Fe | Al | Mn | |
| CGI900/5 | 46.6 | 34.8 | 14.4 | 3.8 | 0.4 | 38.2 |
| CGA900/5 | 42.1 | 45.3 | 7.5 | 2.0 | 3.1 | 29.4 |
| NGI930/5 | 48.3 | 16.1 | 18.0 | 15.9 | 1.7 | 30.9 |
| NGA930/5 | 44.2 | 16.2 | 18.9 | 20.1 | 0.6 | 32.6 |

Compared to conventional samples, the presently disclosed coatings (galvanized and galvannealed) were austenitized at a higher temperature (930° C.). Yet, increasing austenization temperature usually increases zinc evaporation and oxidation, resulting in more zinc loss from the coating. However, the data of Table 1 provides evidence that in the presently disclosed coatings NGI930/5 and NGA930/5, zinc evaporation/oxidation was reduced compared to conventional zinc coatings. This outcome was confirmed by the much lowered zinc content in the surfaces (i.e. significantly reduced zinc oxide) of the presently disclosed coatings when compared to the zinc contents present in the α-Fe(Zn) phase, which were comparable to the zinc contents in the α-Fe(Zn) phase of the conventional zinc coatings CGI900/5 and CGA900/5. The Al contents (of the oxide) in the surfaces of NGI930/5 and NGA930/5 were four to ten times higher than in the surface of CGI900/5 and CGA900/5, thus indicating more aluminum oxide ($Al_2O_3$) formed on NGI930/5 and NGA930/5. While not being held to any particular theory, it is believed that more complete coverage of $Al_2O_3$ is provided in the present coatings which results in increased suppression of zinc evaporation and oxidation. The data of Table 1 indicates that the surfaces of NGI930/5 and NGA930/5 are essentially covered by a thin and continuous $Al_2O_3$ film, with a scarce amount of zinc oxide and Mn-rich oxide scale.

From the data of Table 1, the presently disclosed coating comprising a ratio of atomic weight percent amount of zinc to aluminum of about 0.8 to about 8.0 in the surface oxides provides improved cathodic corrosion protection for steel sheet subject to austenization and/or hot press forming. For example, a ratio of atomic weight percent amount of zinc to aluminum of about 0.8, 0.9, 1.0, 1.5, 2.0, 2.5, 3.0, 3.5, 4.0, 4.5, 5.0, 5.5, 6.0, 6.5, 7.0, 7.5, 7.6, 7.7, 7.8, 7.9 or 8.0 in the surface oxides provides improved cathodic corrosion protection for steel sheet subject to austenization and/or hot press forming.

From the data of Table 1, the presently disclosed coating comprising a ratio of atomic weight percent amount of zinc to oxygen of about 0.3 to about 0.7 in the surface oxides provides improved cathodic corrosion protection for steel sheet subject to austenization and/or hot press forming. For example, a ratio of atomic weight percent amount of zinc to oxygen of 0.3, 0.4, 0.5, 0.6, or 0.7 in the surface oxides provides improved cathodic corrosion protection for steel sheet subject to austenization and/or hot press forming.

From the data of Table 1, the presently disclosed coating comprising a ratio of atomic weight percent amount of aluminum to oxygen of about 0.1 to about 0.6 in the surface oxides provides improved cathodic corrosion protection for steel sheet subject to austenization and/or hot press forming. For example, ratio of atomic weight percent amount of aluminum to oxygen of 0.1, 0.2, 0.3, 0.4, 0.5, or 0.6 in the surface oxides provides improved cathodic corrosion protection for steel sheet subject to austenization and/or hot press forming.

Both the conventional GI bath and the Zn—Al—Mn—Sb alloy bath had similar Al levels, however, CGI900/5 did not show the same effect of Al on the surface morphology and zinc evaporation/oxidation as the presently disclosed post-hot pressed coatings, which is attributed to Mn (and/or Sb) present in the presently disclosed coating. Similar findings would be observed with the presently disclosed Zn—Al—Mn or Zn—Al—Sb alloy coatings. For Zn—Al—Mn—Sb alloy or Zn—Al—Sb alloy coatings, the Mn-rich oxide was not appreciably present as a continuous film, but rather as discrete oxide scales sparsely spread on the surface. As a result, manganese oxides were likely unable to be the equivalent of aluminum oxide and other oxygen affine elements in protecting zinc from evaporation and oxidation. Manganese, alone or in combination with antimony, present in the presently disclosed post-high pressed coatings forms manganese oxide along with $Al_2O_3$ on the surface that likely reduces zinc evaporation and oxidation while at the same time providing improved cathodic corrosion protection over that of conventional zinc-aluminum based coatings absent manganese or antimony.

Figure 7:
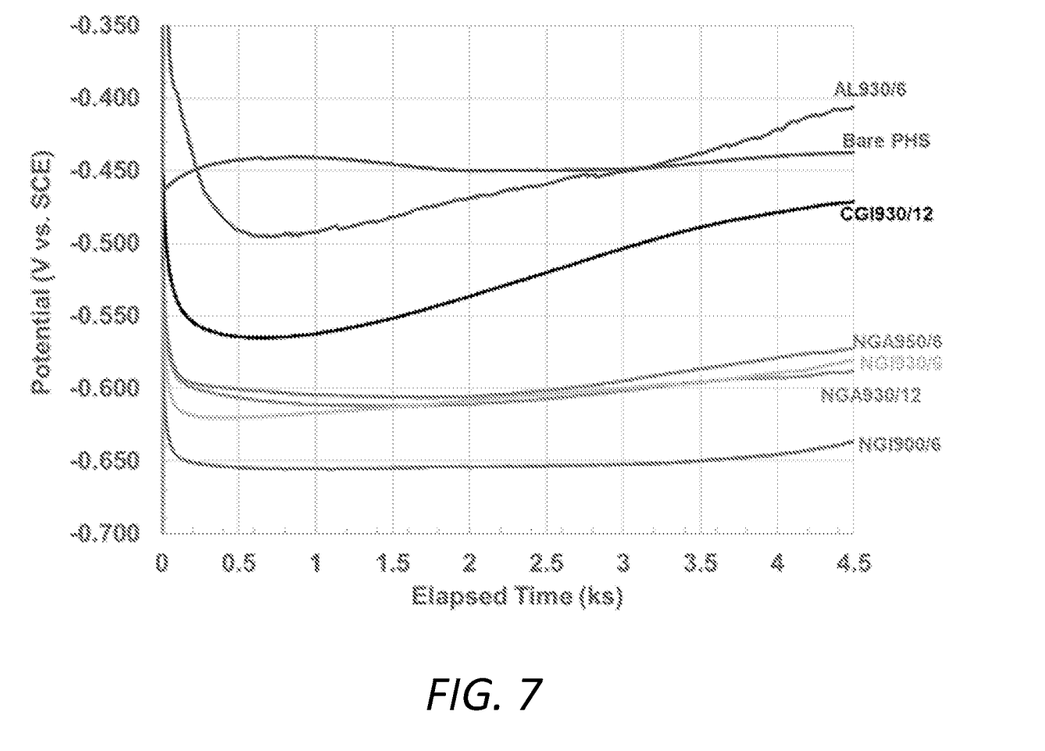
FIG. 7 is a graphical representation of potentials of various conventional hot pressed coatings and coatings in accordance with the present disclosure.

FIG. 7 depicts the potentials of the presently disclosed hot-pressed alloy coatings and comparative examples, designated as follows: NGI900/6=presently disclosed galvanized sample austenitized at 900° C. for 6 minutes; NGI930/6=presently disclosed galvanized sample austenitized at 930° C. for 6 minutes; NGA930/12=presently disclosed galvannealed sample austenitized at 930° C. for 12 minutes; NGA9350/6=presently disclosed galvannealed sample austenitized at 950° C. for 6 minutes; CG930/12=conventional GI sample austenitized at 930° C. for 12 minutes; AL930/6=a conventional non-zinc Al—Si coating austenitized at 930° C. for 6 minutes; and bare PHS as a function of test time under galvanostatic test conditions. According to U.S. Pat. No. 8,021,497B2, a potential difference target of 100 mV (measured as the difference from bare PHS) can be taken as a minimum requirement for cathodic protection. The larger the potential difference, the more effective is the cathodic protection. All of the presently disclosed examples provided a coating to a post press hardened steel with a potential difference of at least 100 mV that sufficiently provided cathodic protection to the steel substrate. While all the zinc based coatings exhibited potentials lower than bare PHS, indicating a capability of cathodic protection to the substrate, in contrast, the potential of AL930/5 increased quickly with time, becoming much higher than the potential of bare PHS. Among the zinc-based coatings, presently disclosed NGI900/6 showed the lowest potential while comparative coating CGI930/12 had the highest potential. The presently disclosed alloy coatings austenitized at 930° C. or 950° C. for 6 min or 12 min did not show considerable differences in potential. As the test time increased, the potential of comparative CGI930/12 coating increased rapidly, significantly narrowing its potential difference with bare PHS. Apparently, comparative non-zinc AL930/5 coating was unable to provide cathodic protection due to very small potential difference with bare PHS. Comparative coating CGI930/12 had a potential difference smaller than 100 mV, which is insufficient to provide effective cathodic protection. Since the presently disclosed hot-pressed coatings had a potential difference larger than 100 mV, they all provided effective cathodic protection.

The term "about", unless otherwise defined herein, is intended to include an upper and lower range of 10% of the stated value. Thus, "about 100," for example, would include a range of 90 to 110 inclusive of the endpoints.

Although the present disclosure has been shown and described in detail with regard to only a few exemplary embodiments of the disclosure, it should be understood by those skilled in the art that it is not intended to limit the disclosure to specific embodiments disclosed. Various modifications, omissions, and additions may be made to the disclosed embodiments without materially departing from the novel teachings and advantages of the disclosure, particularly in light of the foregoing teachings. Accordingly, it is intended to cover all such modifications, omissions, additions, and equivalents as may be included within the scope of the disclosure as defined by the following claims.

We claim:

1. A post-hot pressed cathodic corrosion-protection coating of a sheet steel, the corrosion-protection coating comprising a surface, the surface comprising surface oxides of iron, zinc, aluminum, and manganese; wherein a ratio of atomic weight percent amount of zinc to oxygen is about 0.3 to about 0.7 in the surface oxides.

2. The coating of claim 1, wherein a ratio of atomic weight percent amount of zinc to aluminum is about 0.8 to about 8.0 in the surface oxides.

3. The coating of claim 1, wherein a ratio of atomic weight percent amount of aluminum to oxygen is about 0.1 to about 0.6 in the surface oxides.

4. The coating of claim 1, wherein a ratio of atomic weight percent amount of zinc to aluminum is about 0.8 to about 8.0 and a ratio of atomic weight percent amount of zinc to oxygen is about 0.3 to about 0.7 in the surface oxides.

5. The coating of claim 1, wherein a ratio of atomic weight percent amount of zinc to aluminum is about 0.8 to about 8.0 and a ratio of atomic weight percent amount of aluminum to oxygen is about 0.1 to about 0.6 and a ratio of atomic weight percent amount of zinc to oxygen is about 0.3 to about 0.7 in the surface oxides.

6. The coating of claim 1, wherein an (alpha) α (Fe, Zn) phase is present and a zinc-rich (gamma) Γ phase is absent.

7. The coating of claim 6, wherein the steel sheet comprises boron.

8. A post-hot pressed cathodic corrosion-protection coating of a sheet steel, the corrosion-protection coating comprising a surface, the surface comprising surface oxides of iron, zinc, aluminum, manganese and antimony wherein a ratio of atomic weight percent amount of zinc to oxygen is about 0.3 to about 0.7 in the surface oxides.

9. The coating of claim 8, wherein a ratio of atomic weight percent amount of zinc to aluminum is about 0.8 to about 8.0 in the surface oxides.

10. The coating of claim 8, wherein a ratio of atomic weight percent amount of aluminum to oxygen is about 0.1 to about 0.6 in the surface oxides.

11. The coating of claim 8, wherein a ratio of atomic weight percent amount of zinc to aluminum is about 0.8 to about 8.0 and a ratio of atomic weight percent amount of zinc to oxygen is about 0.3 to about 0.7 in the surface oxides.

12. The coating of claim 8, wherein a ratio of atomic weight percent amount of zinc to aluminum is about 0.8 to about 8.0 and a ratio of atomic weight percent amount of aluminum to oxygen is about 0.1 to about 0.6 and a ratio of atomic weight percent amount of zinc to oxygen is about 0.3 to about 0.7 in the surface oxides.

13. The coating of claim 8, wherein an (alpha) α (Fe, Zn) phase is present and a zinc-rich (gamma) Γ phase is absent.

14. The coating of claim 13, wherein the steel sheet comprises boron.

* * * * *